July 11, 1939.　　　　R. J. RUTHS　　　　2,165,305
SIGNAL DEVICE
Filed July 24, 1936
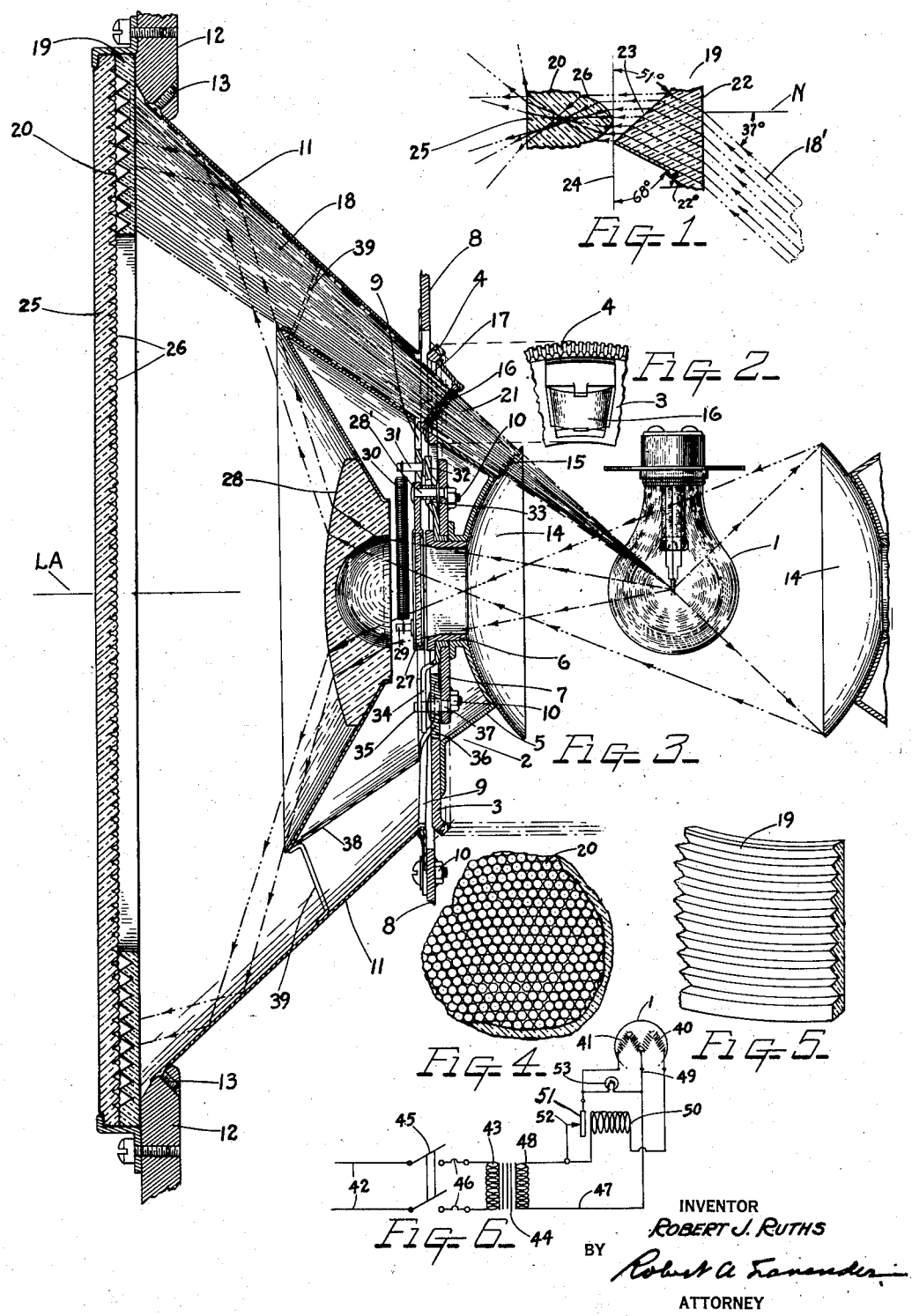
INVENTOR
ROBERT J. RUTHS
BY
ATTORNEY Patented July 11, 1939

2,165,305

UNITED STATES PATENT OFFICE 2,165,305

SIGNAL DEVICE

Robert J. Ruths, Baltimore, Md.

Application July 24, 1936, Serial No. 92,374

4 Claims. (Cl. 116—63)

(Granted under the act of March 3, 1883, as amended April 30, 1928; 370 O. G. 757)

My invention relates to an improved signal device and more particularly, to an improvement on the signal device of my Patent Number 1,886,980 granted to me November 8, 1932. While the signal of my patent is an entirely operative and useful device it does, nevertheless, possess certain inherent disadvantages, to be discussed hereinafter, which it is the purpose of this improvement to eliminate.

In the signal device of my patent I produce the spot of light rotating about the periphery of the signal face by causing an apertured gear to rotate relative to a light source and projecting the light beam emanating from said aperture successively through a series of light channels onto the signal face, the light channels being formed by a number of spaced strips placed about the periphery of the signal face and extending therefrom to the apertured rotating gear. Since the aperture in the rotating gear has a shape and size equal to the cross sectional area of each light channel at the point where the light beam enters the same, it is evident that the light spot appearing on the signal face will have a predetermined shape and intensity whenever the aperture in the rotating gear and the opening in each light channel are in coincidence. When, however, the aperture in the rotating gear passes from a position of co-incidence with a light channel opening to its next position of coincidence with the opening of the succeeding light channel, the light beam emanating from the aperture in the gear will be divided between and projected into adjacent light channels, with the result that the light spot appearing on the signal face will progressively increase in size and diminish in intensity from the spot size and intensity produced by a co-incidence of the gear aperture and channel opening to a point where the gear aperture is approximately bisected by a channel strip and then decrease in size and increase in intensity to the light spot size and intensity obtained when the gear aperture and succeeding channel opening move into co-incidence.

While this periodic change in spot size and intensity incident to a movement of the light beam from one light channel to another in no manner renders the signal device inoperative or causes it to lack utility, it does nevertheless, detract materially from the effectiveness of the device as a signal. A light spot which neither alters its size nor intensity in its path of movement about the periphery of the signal face, is much to be preferred in so far as its effectiveness for signal purposes is concerned. Furthermore, in connection herewith it is to be observed that the manufacture of the light channel strips and the accurate positioning of the same in my patented signal device entails considerable expense, both in labor and material, which it is desirable to avoid.

In my patented device the light of the rotating spot of light and the light of the colored field of light relative to which the spot of light moves are not adequately diffused in directions forwardly of the device, nor is the spot of light intense when compared with the colored field of light so as to accentuate the same with respect thereto. This lack of adequate diffusion and intensity prevents the signal device from attaining a maximum of effectiveness and particularly is this true when the rotating beam of light which produces the light spot is considered. Since the rotating beam of light is substantially without diffusion it emerges from the signal face in the general direction of the light channel thru which it is being projected at any instant in its path of movement. When then the light spot reaches its highest point in its path of movement about the periphery of the vertical signal face, although it can be seen by an observer it cannot be seen to the best of advantage, since the beam of light producing the light spot is directed in general away from the observer. A similar observation may be made regarding the direction of the light beam producing the light spot and its viewability when the light spot reaches a point midway between its highest and lowest points in its path of movement and either to the right or left of its center point of rotation. If then under these conditions an observer views the signal device from the side thereof opposed to that at which the light spot is momentarily positioned, the spot again cannot be seen to the best advantage.

Finally, the signal device of my patent is provided with an incandescent lamp having but a single filament which if it should be rendered inoperative would result in a cessation of signaling function. It would, therefore, be highly desirable if a multiple filament lamp were employed and energizing means utilized for energizing one filament to the exclusion of the other and for energizing and advising of the energization of the other of said filaments upon the first of said filaments being rendered inoperative. Such an arrangement would avoid the confusion and inconvenience attending the use of my patented signal device during critical periods when filament failure occurs and would permit a changing of lamps, either during periods when the signal device was not being used or when the traffic flow was at its lowest.

With the foregoing deficiencies in view it is an object of my invention to provide a signal device for producing a rotating and uninterrupted beam of light of predetermined and unvarying dimensions, which when projected against the signal face of said device will present to the observer a rotating, uninterrupted spot of light of substantially uniform intensity and unvarying shape throughout its cycles of movement.

Another object of my invention resides in the provision of a signal device for producing a rotating concentrated and uninterrupted beam of light of predetermined and unvarying dimensions, which when projected against the signal face of said device will present to the observer a rotating, intense, uninterrupted spot of light of substantially uniform intensity and unvarying shape throughout its cycles of movement.

A further object of my invention resides in the provision of a signal device for producing a rotating beam of light of predetermined and unvarying dimensions and incorporating means for diffusing the same, whereby to present to the observer a rotating spot of diffused light having a selected and unvarying shape.

A still further object of my invention resides in the provision of a signal device for producing a rotating beam of light of predetermined and unvarying dimensions and for producing a colored field of light changing in color at the completion of each cycle of movement of said rotating beam of light, the said signal device incorporating means for diffusing the said beam of light and the light of said colored field of light, whereby to present to the observer a rotating spot of diffused light of unvarying and selected shape moving relative to a field of diffused colored light.

A still further object of my invention resides in the provision of a signal device for producing a rotating, concentrated beam of light of predetermined and unvarying dimensions and for producing a colored field of light changing in color at the completion of each cycle of movement of said rotating beam of light, the said signal device incorporating means for diffusing the said beam of light and the light of said colored field of light, whereby to present to the observer a rotating spot of diffused, intense light of unvarying and selected shape moving relative to a field of diffused colored light and accentuated with respect thereto.

Another object of my invention resides in the provision of a signal device for producing a rotating beam of light wherein continuity of operation is insured by employing a multiple filament lamp and energizing means therefor such that one filament is energized to the exclusion of the other and the other is energized and the energization thereof made apparent upon the first named filament being rendered inoperative.

These and other objects and many of the attendant advantages of this invention will be readily appreciated as the same becomes better understood by reference to the following description when considered in connection with the accompanying drawing wherein:

Fig. 1 is an enlarged cross sectional view of a portion of the pair of adjacent face lenses showing a portion of the rotating beam of light impinging thereupon and the path taken by the beam portion due to the refraction thereof by the said lenses;

Fig. 2 is a fragmentary view in side elevation of the rotatable gear carrying a lens for cooperation with the source of illumination whereby to produce the rotating beam of light;

Fig. 3 is a view in cross section of my improved signal device;

Fig. 4 is a fragmentary view of the outer face lens;

Fig. 5 is a fragmentary perspective view of the inner face lens; and

Fig. 6 shows schematically the circuit arrangement used in connection with the multiple filament lamp of the signal device.

Turning now to Fig. 3 of the drawing there is shown therein a multiple filament lamp 1 mounted adjacent to a rotatable member identified in general by the reference character 2. The rotatable member comprises an annular gear 3 provided at the periphery with gear teeth 4, having secured thereto the truncated conical like member 5, which in turn is secured to the apertured flanged member 6. The rotatable member 2 comprised of the aforementioned parts is mounted for rotary movement upon the plate 7, which is rigidly secured to the stationery inner wall structure 8 by means of the straps 9 and suitable fastening means 10. Each of the supporting straps 9 passes thru a suitable aperture provided in the outer reflector 11, which likewise is secured to the inner stationary wall structure 8 and extends therefrom into engagement with the outer wall structure 12 and is held in place there by suitable securing means 13. The truncated conical like member 5 and the flanged apertured member 6 serve as a support for a reflector 14, which has a central aperture coincident with that of the flanged member 6 and is provided at the periphery with the cut out portion 15 in alignment with a lens 16 carried by the annular gear 3 and adjacent an aperture 17 therein.

The purpose of the lens 16 is to produce in conjunction with the source of illumination 1, a beam of light 18 of predetermined and unvarying dimensions for projection against the face lenses 19 and 20. The lens 16 as shown is also designed to gather in a large area of light 21 and concentrate the same in the direction of the beam rotation so as to produce an intense and concentrated spot of light upon the face lenses. In order to accomplish the foregoing the lens as shown is provided with a suitable curvature on the incident side thereof, which depends upon the index of refraction of the material used, and with a plain or a flat surface on the emergent side thereof. It will be observed that the lens 16 is substantially trapeziform in shape so as to produce a spot of light which is substantially trapeziform in shape. While I have shown the lens 16 designed so as to produce a beam of light 18 concentrated in the direction of rotation of the beam of light and a lens 16 substantially trapeziform in shape, I do not desire to be limited to this specific structure, since within the purview of my invention the lens need not be of a concentrating type nor of a trapeziform shape, but may be constructed to produce a light spot on the face lens of any other desired shape and intensity.

It is thus seen that the rotatable member 2 carrying the lens 16 and cooperating with the source of illumination 1, produces a rotating beam of light 18 of predetermined and unvarying dimensions, which is projected against the inner surface of the inner face lens 19. It is the function of the inner face lens 19 to refract the rotatable beam of light impinging thereupon into a direction which is substantially parallel to the longitudinal axis LA of the signal device and the function of the outer face lens 20 to refract the refracted beam of light emerging from the inner face lens 19 into an optimum of multiplicity of directions when the refracted rotating beam of light is incident upon the inner surface of the outer face lens 20 in its direction of emergence from the inner face lens 19. Thus the inner and outer face lenses 19 and 20, in so far as the rotating beam of light is concerned, cooperate to produce a spot of widely diffused light which can be effectively and easily viewed by an observer from a wide range of positions.

An understanding of the design of the inner face lens 19 may be obtained by reference to Fig. 1 of the drawing which shows a portion of the pair of adjacent face lenses 19 and 20 upon which a portion 18' of the rotating beam of light 18 impinges and the path taken by the beam portion 18' due to the refraction thereof by the said lenses. The beam portion 18' shown impinges at an angle of 37° with a normal N to the inner surface 22 of the lens 19 and upon entering the same is refracted according to the well known law of refraction as stated in the following formula $$\frac{\sin i}{\sin r} = n$$

wherein
$i$ = angle of incidence
$r$ = angle of refraction
$n$ = index of refraction, which is constant for a given material. Both the angles of incidence and refraction are measured from the normal N to the face of the lens.

I have chosen the index of refraction for the material of the face lens 19 as 1.6, it being apparent however, that a material having any other index of refraction may be used if desired. Since the beam portion 18' impinges upon the surface 22 of the face lens 19 at an angle of 37° with respect to the normal thereto and the index of refraction of the material is choosen as 1.6, the angle of refraction is computed as follows:

$$\frac{\sin i}{\sin r} = 1.6;$$

$$\sin r = \frac{\sin 37°}{1.6} = 0.377;$$

$$r = 22°$$

It is thus seen that the portion of the beam of light 18 entering the face lens 19 is bent to an angle of 22° with a normal to the inner surface. A portion of the outer face of the lens 19 is cut at the complement of the angle of refraction, namely, 68°, so as to insure that all the rays will pass thru the lens parallel thereto and reach the other side 23 of the outer surface thereof. If now the beam of light 18' within the lens 19 is to emerge from the face 23 thereof parallel to the longitudinal axis LA of the signal device, it must satisfy two conditions. First, the sine of the angle which the emergent beam makes with the normal to the face 23 divided by the sine of the angle which the beam of light within the lens makes with this normal to the surface 23 must be equal to the index of refraction of the material. Secondly, the angle which the emergent beam makes with the normal to the surface 23 of the lens minus the angle which the beam of light within the lens makes with this normal to the surface 23 must be equal to the angle of 22° which is the angle of refraction previously computed. Stating the aforementioned conditions mathematically the following equation is obtained:

$$\sin i_1 = n \sin (i_1 - 22°);$$

$$\tan i_1 = \frac{n \sin 22°}{(n \cos 22° - 1)} = 1.24;$$

$$i_1 = 51°$$

wherein $i_1$ is the angle which the emergent beam of rays makes with a normal to the surface 23 of the lens 19. Since the angle of 51° formed by the emergent beam and the normal to the surface 23 has its sides mutually perpendicular to the vertical line 24 and the surface 23, it is apparent that the angle between the vertical 24 and the surface 23 of the lens 19 must also be 51°. Thus the portion of the lens 19 shown in Fig. 1 of the drawing is designed with an index of refraction of 1.6 so that a portion 18' of the beam 18 incident upon the surface 22 thereof will be refracted by the lens into a direction which is substantially parallel to the longitudinal axis LA of the signal device. The other emergent faces of the lens 19 are designed in a similar fashion, slightly varying angles of incidence, however, being taken to account for the varying angles at which the various portions of the beam of light 18 strike the inner face of the lens 19. The foregoing values of the angle of incidence and the index of refraction assumed in the calculations are merely illustrative of the design of the lens 19 and I do not desire to be restricted thereto, since any angle of incidence and any index of refraction may be chosen within the purview of my invention, so long as the lens 19 is designed to refract the incident beam of light thereon into a direction which is substantially parallel to the longitudinal axis of the signal device.

The outer face lens 20 serves not only as a refracting means for the rotating beam of light 18 but also as a refracting means for the light of the colored field of light to be discussed hereinafter. This lens has a plain outer surface 25 and has the inner face thereof, upon which the light is incident, provided with a number of protuberant portions or facets 26 of such surface contour that for a given index of refraction each of these protuberant portions or facets will refract any light which is incident thereupon in a direction substantially parallel to the longitudinal axis of the signal device into an optimum multiplicity of directions. Thus the lens 20 is designed to refract rays which are incident thereupon in a direction substantially parallel to the longitudinal axis of the signal device into all directions up to slightly less than 90° from a normal to the outer surface of the lens, thereby permitting the observer to view the signal from a wide range of positions.

In Fig. 1 of the drawing there are shown the paths which the various rays of the beam 18' emerging from the lens 19 take in a portion of the lens 20 when incident upon a facet 26 thereof. Thus a ray of the beam 18' incident upon the lower portion of the facet 26 will emerge from the face of the lens 20 at an angle of 85° to the normal at the outer surface when the facet is designed as shown and the index of refraction of the lens material is 1.6. Rays of light of the beam 18' incident upon portions of the facet 26 intermediate the point previously mentioned and the apex of said facet will be refracted upon emerging from the face 25 to the lens in directions intermediate the normal to the surface 25 of this lens and the direction taken by the ray of light at an angle of 85° to the normal. Any ray of light striking the apex of the facet will pass directly thru the lens without refraction. As illustrative but not restrictive of the dimensions the facets of the lens 20 may assume the following: If a face lens 20 has an index of refraction of 1.6 and a diameter of 9⅛", the base with which the facets are integral will have a thickness of ⅜ of an inch and the facets a height of 1/16 of an inch. The curvature of the facet will then be 1/16 of an inch with the center of curvature at the line of intersection of the facet with the base with which it is integral. Thus the face lens 20 is designed to refract any light incident thereupon into an optimum of multiplicity of directions when the light is incident thereupon in a direction which is substantially parallel to the longitudinal axis of the signal device. Being thus designed it provides a light which is well diffused and viewable from a wide range of positions.

The light from the source of illumination 1 also passes into the aperture of the flanged member 6 thru a color filter 27 and diverging lens 28 to the face lenses 19 and 20 previously described whereby to provide a colored field of light over the entire signal face and relative to which the light spot moves. The color filter 27 is bi-colored, preferably red and green, and is mounted on the fixed plate 7 by means of the pin 28' for swinging movement. To the lower portion of the frame of the color filter 27 there is secured a pin 29 to which is fastened the spring 30, having its other end secured to a second pin 31 carried by a key like member 32, which is mounted for partial pivotal movement on the plate member 7. The key like member 32 is apertured at 33 so that it may move relative to the pivotal point 28' of the color filter, and at its lower end is slotted to form a guideway 34 within which a pin 35 slides forming an integral part of an interrupted gear 36 and eccentric thereof, the said gear being mounted for pivotal movement at 37 on the stationary plate member 7. The inner portion of the annular gear member 3 is provided with a segmental rack which is adapted to engage a portion of the teeth of the interrupted gear 36 once in each revolution, to thereby cause the interrupted gear 36 to turn thru a half of a revolution and thus move the pin 35 integral therewith from one position to a diametrically opposed position.

The color filter 27 is operated in the following manner so as to cause the same to be shifted each time the annular gear member 3 completes a revolution of movement. At a point in advance of the completion of one cycle of movement of the annular gear member 3 the segmental rack engages a portion of the teeth of the interrupted gear 36 and causes the same to complete a half of a revolution, thereby moving the pin 35 integral therewith from its position of rest to a position diametrically opposed. Since the pin 35 rides in the slot 34 of the key like member 32, the key like member will be caused to rotate about its pivotal point of support and carry with it the end of the spring 30 secured to the pin 31 to a position which is past the pivotal point of support 28' of the color filter 27, and thus cause the color filter to move from its position of rest to a second position of rest and project a different colored portion thereof into the path of the light emanating from the source of illumination 1. It is therefore apparent that the colored field of light is changed in color at the completion of each cycle of movement of the annular gear member 3 and hence at the completion of each cycle of movement of the rotating beam of light 18. The mechanism or means for shifting the color filter 27 at the completion of each cycle of movement of the rotatable member 2 is identical with that of my device shown in Patent 1,886,980, granted to me November 8, 1932.

The light upon emerging from the color filter 27 impinges upon the inner surface of the concavo-convex lens 28 which refracts the beam of colored light and insures its reaching the various portions of the face lenses 19 and 20 and more particularly, the outer portions of the face lens 19 to thereby make certain that the entire signal face presents a colored field of light relative to which the spot of light heretofore described moves. This concavo-convex lens 28 may have any suitable curvatures of the faces and any desired index of refraction so long as it will accomplish the desired results previously set forth. The lens 28 as shown is supported by an inner reflector 38 which in turn is held in position by means of supporting brackets 39 secured to the inner surface of the outer reflector 11. The function of the inner reflector 38 is to intercept rays of colored light reflected rearwardly by the face lens 20 and for redirecting the same against this lens.

It is to be observed that the outer face lens 20 serves also to refract the light of the colored field of light incident thereupon but only in an optimum multiplicity of directions when the light is incident thereupon in a direction which is substantially parallel to the longitudinal axis of the signal device. It is thus seen that there is provided a diffused field of colored light relative to which the spot of diffused light previously described moves and changing in color at the completion of each cycle of movement of the said spot.

In order to assure the maximum dependability of my signal device I have chosen a multiple filament lamp for the source of illumination 1 and have employed a means for energizing the said lamp such that one filament is energized to the exclusion of the other and the other filament is energized and the energization thereof made apparent when the first filament is rendered inoperative. In order to accomplish the foregoing I have shown in Fig. 6 the incandescent lamp 1 provided with a main filament 40 and an auxiliary filament 41. The current mains leading from the source of alternating current are shown at 42 and are adapted to be connected to the primary 43 of a step-down transformer 44 thru a double pole switch 45 and fuses 46. A conductor 47 connects one side of the secondary 48 of the transformer 44 to a common terminal 49 of the lamp filaments 40, 41. The current from the point 49 flows thru the filament 40 to the solenoid 50 and back to the other side of the transformer secondary 48. A second circuit may be traced from the point 49 thru the auxiliary filament 41, movable contact 51, stationary contact 52 to the other side of the transformer secondary 48. When the transformer is deenergized the movable contact 51 and stationary contact 52 are in their normal closed position. Upon energization of the transformer, however, the current flows thru the conductor 47, terminal point 49, filament 40 and solenoid 50 to the other side of the transformer secondary to thereby energize the filament 40 and the solenoid 50. The energization of the solenoid 50 causes the movable contact 51 to move out of an engagement with the stationary contact 52 and thus leave the filament 40 alone incandesced. When, however, the filament 40 is rendered inoperative for any reason the circuit thru this filament and solenoid 50 will be interrupted, the movable contact 51 caused to engage the stationary contact 52 and the circuit thru the auxiliary filament 41 energized with attendant incandescence of the auxiliary filament 41. In order to advise of the energization of this auxiliary filament 41 I have placed in parallel with this filament a lamp 53 which is rated at a higher voltage than the multiple filament lamp 1 so as to indicate by a subdued light the failure of the filament 40. The lamp 53 may be mounted in any convenient place so as to be easily visible by a repair man. It may, if desired, be mounted in the outer wall structure 12.

The complete unit to the left of the source of illumination 1 shown in Fig. 3 of the drawing is duplicated at the right thereof as evidenced by the fragmentary showing, thus making reflector 14 available for use with the source 1 to cause any rays reflected therefrom to pass thru the aperture in the flanged member 6. A unit may also be placed on each side of the plane of the paper if desired. If four complete units are employed the four annular gear members 3 are positioned in intermeshing relation and operated in timed relation by an electric motor thru suitable gearing as shown in my Patent 1,886,980, granted to me November 8, 1932. If, on the other hand, only one or two units are employed the annular gear or gears may be driven by any suitable means known to the prior art.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

This invention may be manufactured and used by or for the Government of the United States of America for governmental purposes without payment of royalties thereon or therefor.

I claim:

1. A signal device comprising in combination means for producing a rotating beam of light of predetermined and unvarying dimensions extending at an angle to the longitudinal axis of the signal device and means for diffusing the said beam of light whereby to present to the observer a rotating spot of diffused light having a selected and unvarying shape, said second mentioned means including a pair of adjacent refracting means, the first of which is designed to refract the rotating beam of light incident thereupon into a direction which is substantially parallel to the longitudinal axis of the signal device and the second of which is designed to refract the refracted beam so that it will emerge therefrom in an optimum multiplicity of directions when the refracted beam is incident upon the second of said refracting means in the direction of its emergence from the first of said refracting means.

2. A signal device comprising in combination a source of illumination, rotatable means including a lens adjacent the source of illumination and cooperating therewith to produce a rotating beam of light of predetermined and unvarying dimensions extending at an angle to the longitudinal axis of the signal device and means for diffusing the said beam of light whereby to present to the observer a rotating spot of diffused light having a selected and unvarying shape, said second mentioned means including a pair of adjacent refracting means, the first of which is designed to refract the rotating beam of light incident thereupon into a direction which is substantially parallel to the longitudinal axis of the signal device and the second of which is designed to refract the refracted beam so that it will emerge therefrom in an optimum multiplicity of directions when the refracted beam is incident upon the second of said refracting means in the direction of its emergence from the first of said refracting means.

3. A signal device comprising in combination means for producing a rotating beam of light of predetermined and unvarying dimensions extending at an angle to the longitudinal axis of the signal device and means for diffusing the said beam of light whereby to present to the observer a rotating spot of diffused light having a selected and unvarying shape, said last mentioned means including a member for refracting the rotating beam of light incident thereupon into a direction which is substantially parallel to the longitudinal axis of the signal device.

4. A signal device comprising in combination means for producing a rotating beam of light of predetermined and unvarying dimensions extending at an angle to the longitudinal axis of the signal device and means for diffusing the said beam of light whereby to present to the observer a rotating spot of diffused light having a selected and unvarying shape, said last mentioned means including an annular member for refracting the rotating beam of light incident thereupon into a direction which is substantially parallel to the longitudinal axis of the signal device and a faceted member for refracting the light emerging from the first mentioned member into substantially all directions forwardly of the device.

ROBERT J. RUTHS.